No. 777,996. PATENTED DEC. 20, 1904.
O. R. APPLEGATE.
BASIN HOLDER.
APPLICATION FILED MAR. 10, 1904.
NO MODEL.
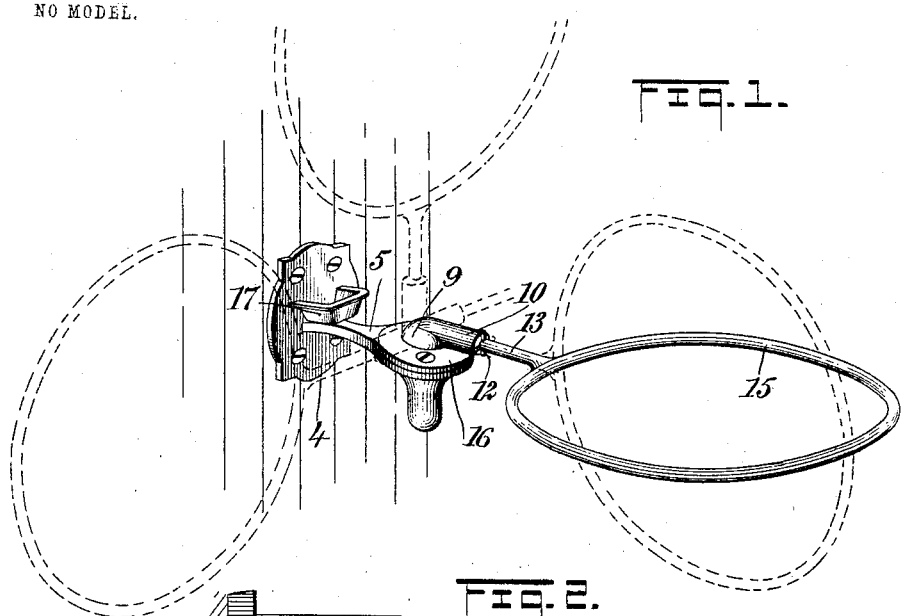
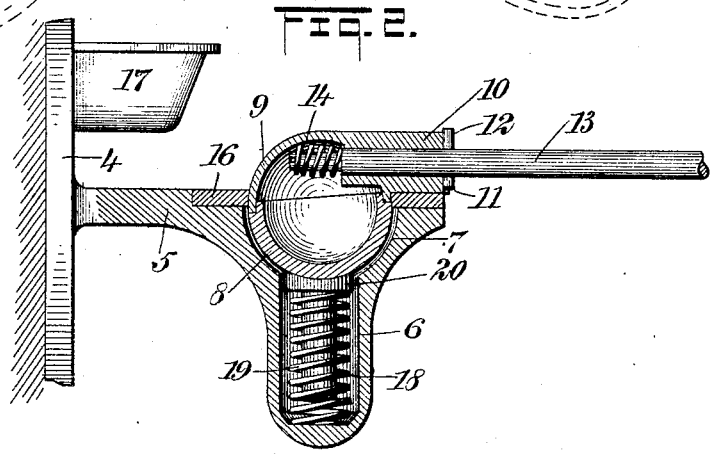
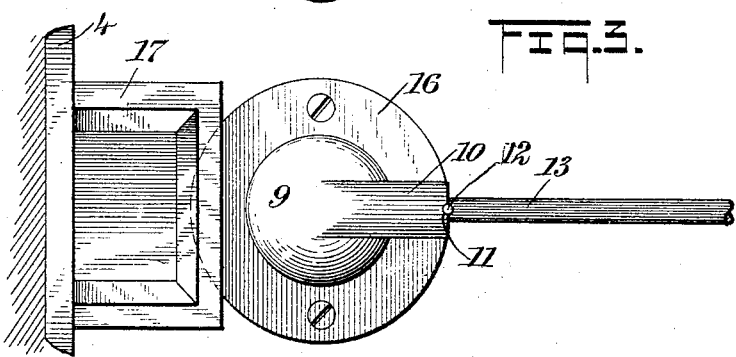
WITNESSES:
INVENTOR
Oscar R. Applegate
BY
ATTORNEYS No. 777,996.

Patented December 20, 1904.

UNITED STATES PATENT OFFICE.

OSCAR ROY APPLEGATE, OF TRENTON, NEW JERSEY.

BASIN-HOLDER.

SPECIFICATION forming part of Letters Patent No. 777,996, dated December 20, 1904.

Application filed March 10, 1904. Serial No. 197,422.

*To all whom it may concern:*

Be it known that I, OSCAR ROY APPLEGATE, a citizen of the United States, and a resident of Trenton, in the county of Mercer and State of New Jersey, have invented a new and Improved Basin-Holder, of which the following is a full, clear, and exact description.

My invention relates to devices for holding washbasins and other similar receptacles, and is adapted for general use in holding articles of all kinds.

The particular objects of my invention are to provide a device of the character mentioned which when not in use may be folded back against the wall or support in any direction and which will be capable of holding an article at different angles.

Further objects will appear in the course of the subjoined description.

Reference is to be had to the accompanying drawings, forming a part of this specification, in which similar characters of reference indicate corresponding parts in all the figures.

Figure 1 is a perspective view of a preferred form of my invention, showing in dotted lines several positions which it may assume. Fig. 2 is a sectional view showing the interior parts, and Fig. 3 is a plan view.

In the drawings, 4 represents a support which is adapted to be secured to a wall or any other vertical or other surface. The support 4 is provided with a projection 5, having a downwardly-extending well 6 and a semicylindrical interior surface 7. A universal joint is attached to this projection, this joint consisting of two hemispheres 8 and 9, one of which at least should be hollow. The upper part 9 of this joint is provided with a projection 10, extending outwardly and having a plurality of grooves 11 on its end adapted to receive a pin 12, which passes through a rod 13 of the holding member proper. The rod 13 passes through a bore in the projection 10 and is provided with a spring 14 at its rear end in the interior of the joint for the purpose of holding the rod in the desired position by the aid of the pin 12 and the grooves 11. The holding member proper comprises also a hub 15 or other device for receiving and retaining the basin or receptacle which it is desired to support.

16 is a plate attached to the top of the projection 5 for holding the universal joint in position.

17 is a soap-cup attached to the support 4.

18 is a friction member located in the well 6 and provided with a spring 19, which holds the friction-surface 20 in intimate contact with the hemisphere 8 and produces a constant pressure thereupon for the purpose of holding the joint in any position assumed until a strong force is brought to bear to turn the joint. The dotted lines in Fig. 1 will clearly show the position which the holding member may be made to assume, and a detailed description of each adjustment will not be required.

It will be seen that by pulling the bar 13 outwardly against the force of the spring 14 the pin 12 will be removed from its groove and the bar 13 may be turned to any desired position, and if turned to a position in which the pin 12 can seat in another groove 11 the holding member will be secured in such position as long as no force is applied to pull on the rod 13. When the device is not in use, it can obviously be turned up against the wall, either vertically above the projection 5 or to one side, as indicated.

This device is very simple. It may be readily taken apart and put together and will hold a basin or anything else in the desired position without the employment of tools for tightening up the parts.

Having thus described my invention, I claim as new and desire to secure by Letters Patent—

1. The combination of a support having a concave seat, and a hollow spherical bearing resting in said seat and having a passage through its walls, with a holding-rod passing through said passage into the interior of said bearing, and means within the bearing for holding said rod in position with respect to the bearing.

2. The combination of a support having a concave seat, and a hollow spherical bearing resting in said seat and having a projection, said projection having a passage longitudinally therethrough and grooves upon its end, with a basin-holder comprising a rod passing through said passage into the interior of the bearing and having a pin adapted to engage with said grooves, and holding means in the bearing for holding said basin-holder in position.

3. In a basin-holder, the combination of a support having a concave seat and a bearing resting therein, said bearing consisting of two hollow hemispherical parts, means for securing said parts together, means for removably securing said parts in said seat, one of said hemispherical parts having a passage therethrough, a basin-holding rod passing through said passage into the interior of the bearing, and means within the bearing for holding said rod in position.

4. In a basin-holder, the combination of a support having a cavity and a concave seat, a hollow hemispherical bearing having a passage in its walls and resting in said seat, a friction member and a spring in said cavity, said spring having one end thereof in engagement with said friction member and acting to force it against said bearing, a basin-holding rod passing through said passage and having its end within said hollow bearing, and a spring within said bearing for holding said rod in position.

5. The combination of a holding-hoop, a universal joint therefor comprising two hemispheres, a concave member, and means for securing the hemispheres in said concave member, one of said hemispheres being provided with a groove for the reception of the other, a passage in said joint, a yielding means in said joint for securing said holding-hoop thereto, a support, yielding means in said support for causing a constant pressure to be exerted upon a member of said joint, and a soap-holder on said support.

In testimony whereof I have signed my name to this specification in the presence of two subscribing witnesses.

OSCAR ROY APPLEGATE.

Witnesses:
ISAAC F. GILES,
GEORGE M. APPLEGATE.